Feb. 5, 1952  H. W. LINDENMUTH  2,584,478
AUTOMOBILE SELF-STARTER SAFETY SWITCH
Filed March 31, 1949  3 Sheets-Sheet 1
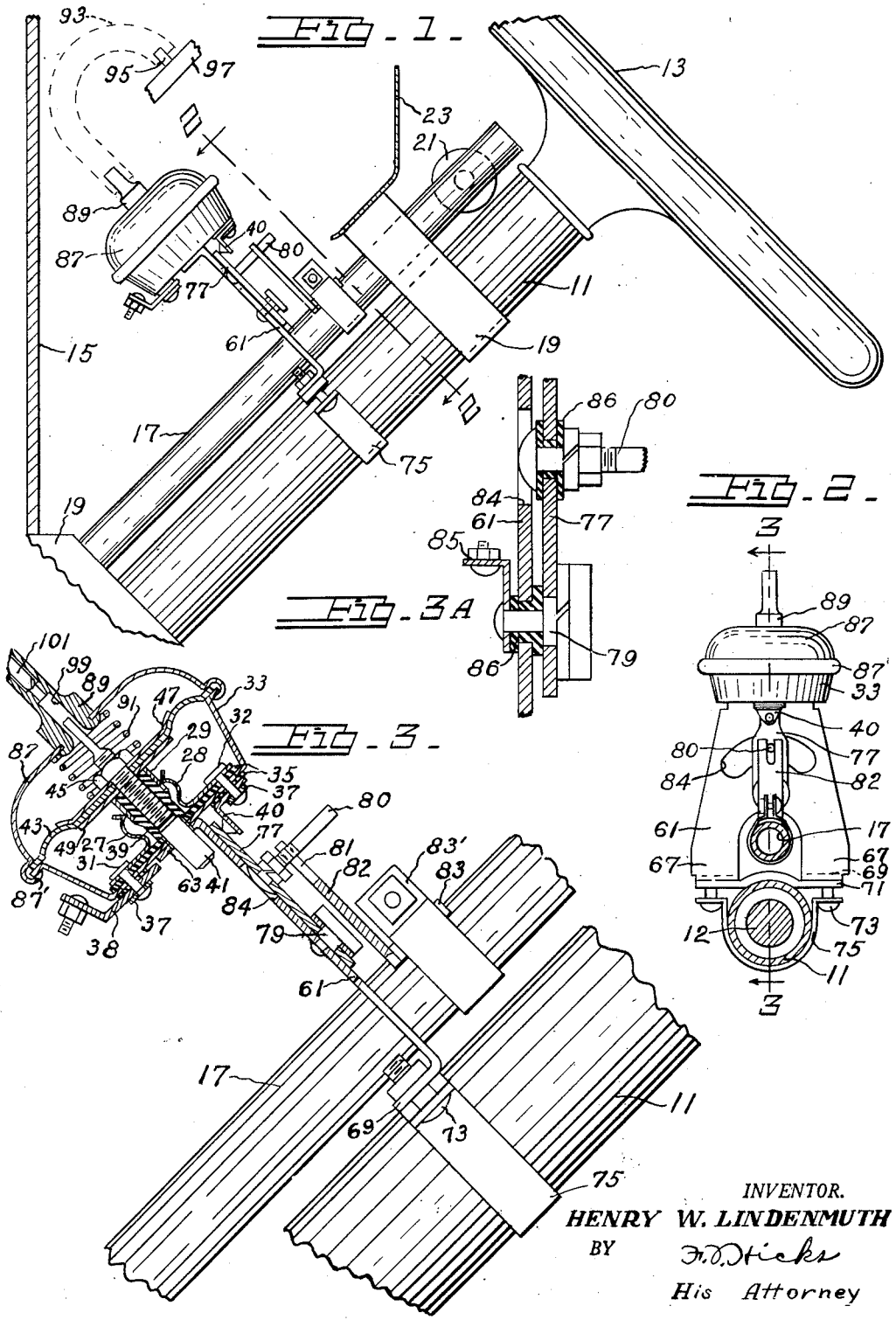
INVENTOR.
HENRY W. LINDENMUTH
BY F.D.Hicks
His Attorney Feb. 5, 1952 H. W. LINDENMUTH 2,584,478
AUTOMOBILE SELF-STARTER SAFETY SWITCH
Filed March 31, 1949 3 Sheets-Sheet 2
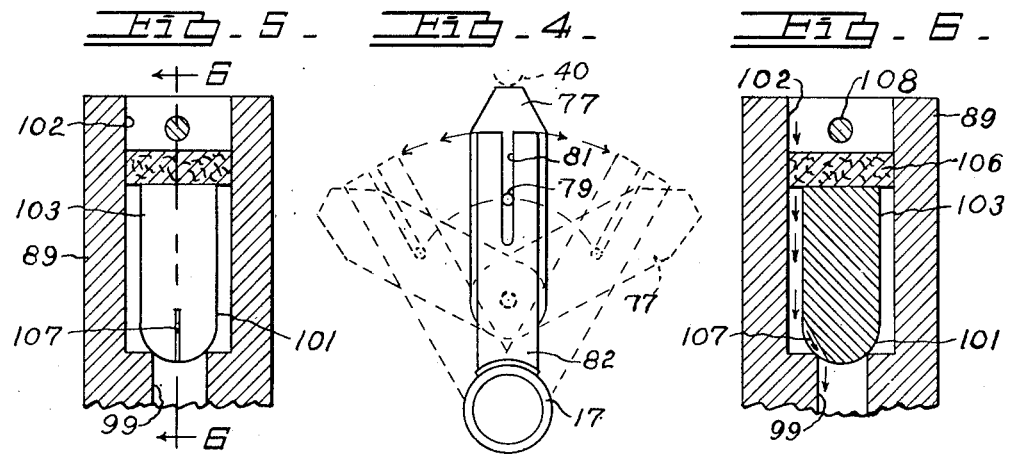
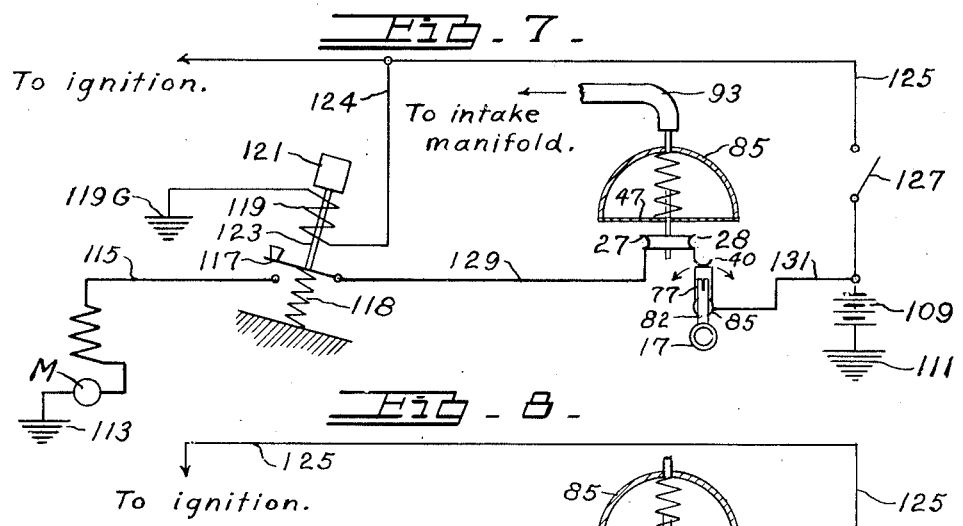
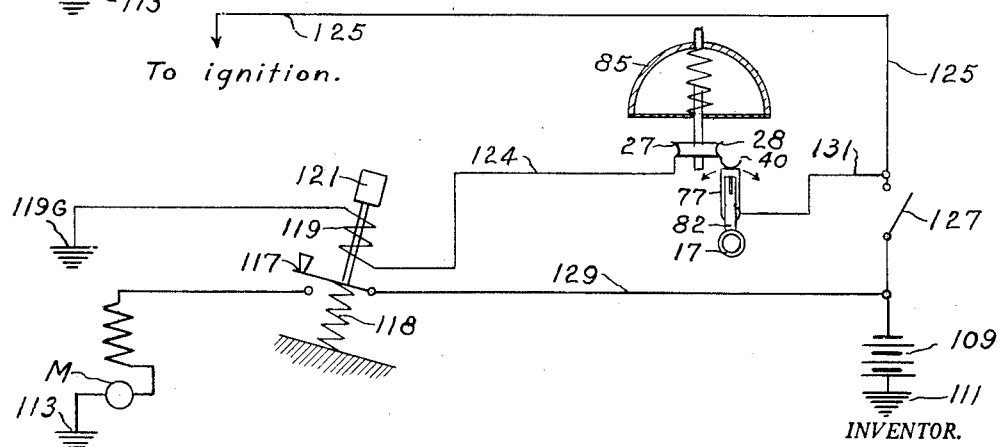
INVENTOR.
HENRY W. LINDENMUTH
BY F.T.Hicks
His Attorney

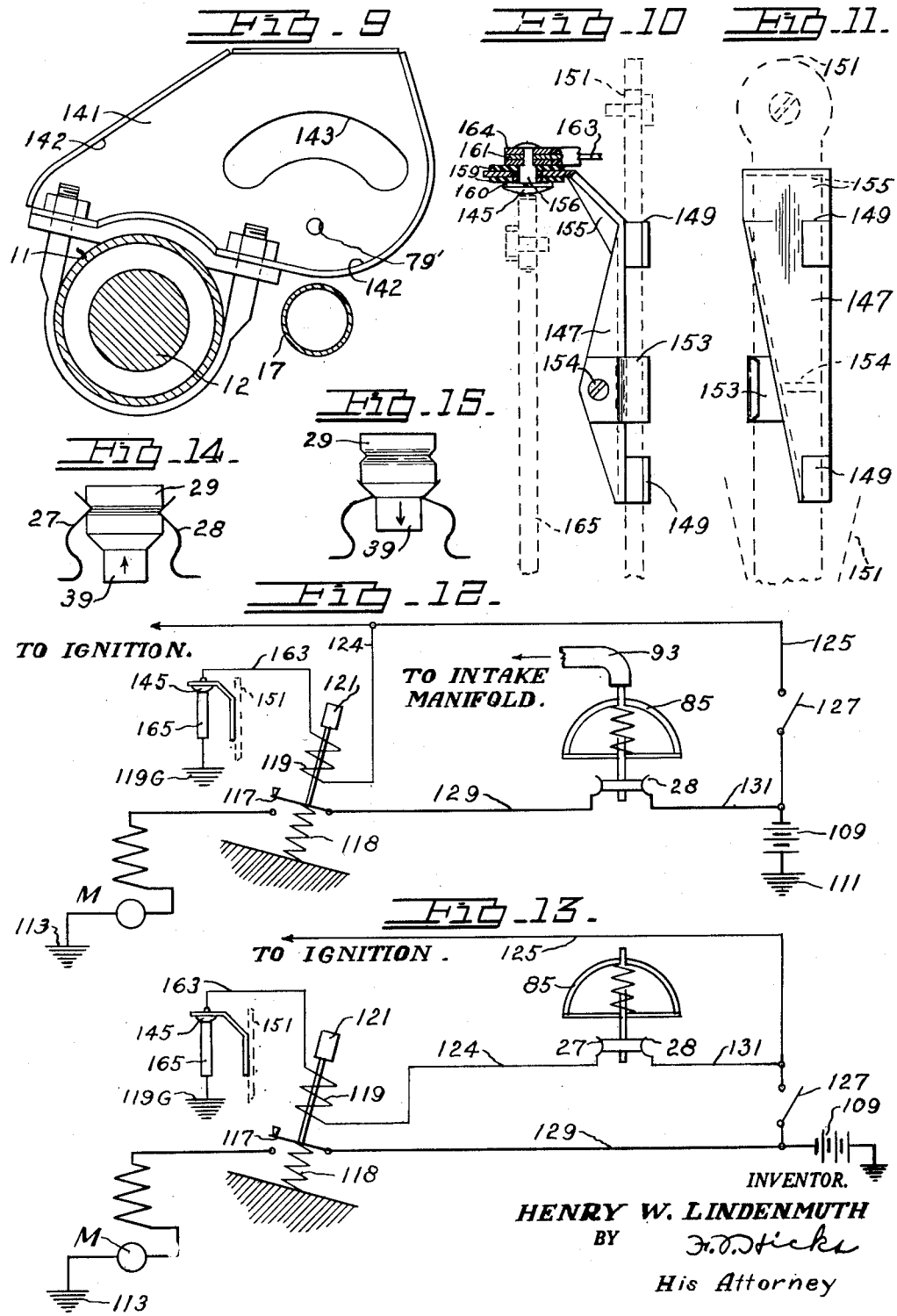

Patented Feb. 5, 1952

2,584,478

UNITED STATES PATENT OFFICE 2,584,478

AUTOMOBILE SELF-STARTER SAFETY SWITCH

Henry W. Lindenmuth, Dearborn, Mich., assignor to Auto-Go, Incorporated, a corporation of Michigan Application March 31, 1949, Serial No. 84,529

7 Claims. (Cl. 200—59)

The invention pertains to safety apparatus for preventing the operation of the electric self-starter of an automobile vehicle either when the gear shifter is in position away from the neutral position or when the engine is running. The invention is an improvement on the apparatus disclosed and claimed in my Patent Number 2,094,177 and also is especially an improvement on my copending patent application Serial No. 25,817, filed May 8, 1948, and relating more particularly to vehicles equipped with the usual steering column type of gear shifter.

Although the invention is especially advantageous for use with automatic self-starting systems on automobiles, it will be understood that the invention may also be usefully applied to any automobile starting system which utilizes an electric motor for cranking an internal combustion engine. Also the gear shifter responsive switch may be utilized for other purposes.

It is an object of the invention to provide an improved automobile safety arrangement which is convenient to apply, which is simple to manufacture and install, which is rugged and which is responsive and reliable in operation under all temperature conditions.

It is also an object of the invention to provide such a self-starter safety arrangement for use on automobiles having the conventional steering column mounted gear shifters, and which is readily connected with such a gear shifter, in a relation which remains operative with relative movement between parts.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, in which:

Fig. 1 is a side elevational view, partially sectioned and showing a portion of an automobile having a conventional steering column gear shifter;

Fig. 2 is a cross-sectional view on line 2—2 in Fig. 1;

Fig. 3 is an enlarged cross-sectional view on line 3—3 in Fig. 2;

Fig. 3A is an enlarged view of a portion of Fig. 3;

Fig. 4 is a partially diagrammatic view showing the cooperative relation between the actuator arm and the contactor lever operated thereby;

Fig. 5 is a sectional view showing the slow bleeding check valve in the connection fitting, similarly to Fig. 3 but greatly enlarged and fragmentary;

Fig. 6 is a sectional view on line 6—6 on Fig. 5, diagrammatically representing the slow reverse flow action of the valve;

Fig. 7 is a schematic view diagrammatically representing how the safety switch of the present invention may be connected into the self-starter circuit of an automobile;

Fig. 8 is a similar view illustrating another starter system wherein my starter safety control switch may be utilized for holding the automobile self-starter circuit open and inoperative at times when it should not be operated;

Fig. 9 is a plan view of a mounting bracket for mounting the safety starter control switch on a well known make of automobile which has the gear shifter disposed along one side of the steering column;

Fig. 10 is a side elevational view, partially broken away and sectioned, for showing a different embodiment of gear shifter actuated switch, which is installed independently from the suction actuated switch, upon a gear shifter bar, shown dotted;

Fig. 11 is a view thereof at right angles from Fig. 10;

Fig. 12 is a diagrammatic view showing how such a gear shifter actuated switch may be utilized in cooperation with the suction switch mounted independently and remotely therefrom;

Fig. 13 is a similar view showing how this arrangement may be utilized in different circuits; and Figs. 14 and 15 are diagrammatic views illustrating the snap action of the suction switch.

Referring more specifically to Figs. 1, 2 and 3 of the drawings, it will be seen that I have illustratively disclosed an embodiment of my invention as installed upon a conventional automobile embodying a usual steering column 11 enclosing a shaft 12 which has a steering wheel 13 upon the upper end and the lower end of the steering column and shaft passing down and forwardly through the front panel 15 of the passenger compartment of the automobile, for operative connection with the front wheels through conventional connecting elements (not shown) in any well known manner.

A well known type of steering column gear shifter is represented embodying a rotative gear shifter 17 mounted parallel to and slightly spaced from the steering column, and rotatively supported in supports 19, and from an instrument board 23 in any conventional manner. Such a gear shifter 17 commonly has a handle 21 projecting laterally and conveniently disposed under the steering wheel for shifting the automobile gears, in a well known manner, by a combination of rotary and axial movements imparted through the shifter 17, and transmitted to the gears through conventional linkages, not shown.

In accordance with my invention, I provide a starter circuit safety switch comprising a pair of electrical contacts 27 and 28 mounted in spaced apart relation to be connected together by a bridging contact 29 for completing the starter circuit, or a starter control circuit, only at such times when conditions are such that it is safe to use the starter to start the automobile engine, as will be subsequently described in detail.

Electrical contacts 27 and 28 are made of good conductive metal and conformed to have suitable resilience to make a good wiping contact upon the bridging contact, when the latter is moved therebetween. As will be understood, the size and weight of these contacts may be varied to suit the magnitude of the current to be controlled, which may be only sufficient to control a relay or electromagnetic switch, or it may control the starter motor current directly, as desired. The two contacts 27 and 28 are secured, and conductive connection is extended therefrom, by means of rivets 31 and 32 passing through larger apertures in the bottom of a bowl shaped switch casing 33 which may be made of sheet metal. Suitable spacer washers 35, of fiber or other insulation material, are inserted to insulate these rivets and the contacts from the casing, as these are clamped by peening the outer ends of the rivets to draw up on washers 37 thereon. The outer extended end of the rivet 31 is provided with an insulated terminal lug 38 clamped under the washer 37 and providing a convenient electrical terminal for securing the end of a connection wire or cable, in a well known manner. The other rivet 32 has a contact 40 clamped snugly under its washer 37 for good low resistance connection. This contact 40 is made in a projecting shape and of some good conductive metal, such as phosphor bronze for example, having desirable resilience to make a good brushing contact with one end of a contactor lever 77, in a manner to be subsequently described in detail. The term "contact" as used in the claims designates the entire united conductive structure from the inside contact 28 to the outer contact 40.

The bridging contact 29 of the starter safety switch is tubular in form and of suitable conductive metal. It is mounted upon a sleeve 39 of any suitable insulation material carried on a pin 41. The upper end of the pin 41 is of a substantially reduced diameter passed up through a central aperture in a flexible diaphragm 43 and externally threaded to receive a clamping nut 45 thereon. To apply pressure or force uniformly upon the diaphragm without undue concentration causing injury thereto, it is preferable to provide a thin, centrally apertured pressure plate 47 on top of the diaphragm and under the clamping nut, the outer edges of the pressure plate being turned or dished upwardly. For a similar purpose, a fiber washer 49 is preferably disposed on the pin 41 under the diaphragm.

To conveniently mount the switch casing in a proper position in a suitable relation adjacent the gear shifter tube 17, I provide a sheet metal bracket 61, the upper end of which is turned to provide an attachment flange 63, which is conveniently attached to the bottom of the casing by welding, or in any suitable manner. This attachment flange 63 may have an aperture for freely passing a projecting end of the pin 41. The sheet metal bracket is stamped out to provide at its lower end spaced legs 67 suitable to pass over the rotative gear shifter 17 and having turned lugs 69 to engage the ends of a clamp bar 71 passed over the steering column 11. Bolts 73 are passed through the lugs 69 on the spaced legs 67 of the bracket into the ends of a clamp band 75 around the steering column for securing the switch and bracket firmly thereon.

The contactor lever 77 has one end pivotally mounted on a headed pivot pin 79 in the bracket. This contactor lever is suitably shaped and positioned so that its free swinging end may be moved to or from the contact 40 projecting from the switch casing. From an intermediate portion of the contactor lever 77 a pin 80 projects laterally and passes freely in a slot 81 in the end of an actuator arm 82 which extends rigidly from the side of the shifter 17 on which it is secured by a lug 83 projecting laterally at the other end and a clamp 83". In systems where engagement of the contactor lever 77 with the contact 40 is for completing connection through a circuit wire or cable to be connected therefrom, a terminal 85 is provided on the end of the pivot pin 79, as shown in Fig. 3A, and this pin is insulated from the bracket by means of fiber insulation washers or parts 86, in a well known manner. The spring washer shown under the head of pin 79, maintains tension, in both modifications. Also for such a system, the intermediate pin 80 projecting from the lever 77 is likewise insulated therefrom by insulation parts 86 to avoid grounding through contact with the actuator arm 82. An arcuate slot 84 is provided in the bracket to provide clearance for the head of the pin 80 carried by the contactor lever 77. In systems where grounding of the contact 40 is desired, it is only necessary to remove or omit the insulation washers, as shown in Fig. 3, and direct grounding will be accomplished when lever 77 engages contact 40. In either case, a spring washer may be utilized to maintain tension, as shown.

The diaphragm 43 is made of any suitable flexible sheet material such as a fabric coated, or impregnated, with rubber, synthetic rubber or other compounds, or even of a thin sheet metal if preferred, and its edges preferably extend beyond the outwardly extending upper edges of the casing. A sheet metal cover 87 is provided thereon, which is of an inverted bowl shape having edges 87' projecting outwardly still further, so that these edges may be turned down around the edges of the casing for securing the cover thereon and at the same time clamping the edges of the diaphragm therebetween in a hermetically sealed tight relation. The upper portion of the cover 85 is centrally apertured to receive a reduced portion of a connection fitting and valve body 89 peened for snug attachment therein. A compression spring 91 is disposed centrally upon the upper side of the diaphragm to press it down for holding the bridging contact to bridge the switch contacts 27 and 28 when the engine is not running.

The upper end of the connection fitting 89 is suitably conformed to be inserted into the end of a rubber tube 93 (represented by dotted lines)

which extends to a connection fitting 95 disposed in the windshield wiper line 97 from connection into the intake manifold. An aperture 99 is provided through the connection fitting 89 on the cover so that, when the engine of the automobile is running, a partial vacuum is produced in the cover enclosed space over the upper side of the diaphragm. The bottom of the casing being open to atmosphere, the diaphragm is caused to flex upwardly and this lifts the bridging contact away from the spaced switch contacts 27 and 28, so long as the engine is running.

To avoid sudden closing of the safety switch, if the partial vacuum from the intake manifold should fail for a brief interval, I provide a slow bleeding check valve 101 in the connection fixture. This valve is readily seated on a seat formed by providing an enlarged counterbore 102 down into the upper end of the aperture in the connection fixture 89, where its proper seating is predetermined by the guiding effect of its elongated valve stem 103. To provide for slow bleeding of the valve it is cut across, as by a thin saw, to provide a narrow recess 107 across the seating bottom end, as may be more clearly seen in Figs. 5 and 6. A retaining pin 108 is provided transversely in the upper end of the fitting 89 for holding the valve therein. Above the valve and under the pin, a piece of sponge rubber, wool felt 106, or like material, is preferably inserted to hold the valve and prevent it chattering or vibrating. When the valve is seated, the narrow slot 107 in the valve provides for a slow reverse flow or bleeding, as represented by the arrows in Fig. 6. This permits my starter safety switch to close in a predetermined time interval after the engine stops, but prevents it closing instantly.

The valve 101 lifts and allows the air to be drawn out of the casing 85 very quickly, to promptly lift the bridging contact 29 away from the contacts 27 and 28, when the engine starts. To impart a quick snappy movement for this circuit opening operation, the bridging contact 29 is provided with shallow notches to receive the contacting portions of these stationary contacts 27 and 28, which are adapted to seat therein, as may be seen in Figs. 3, 14 and 15. When the vacuum overcomes resistance caused by the spring contacts 27 and 28 in the notches, the contact breaks quickly. Fig. 15 shows how, in the circuit opened position, the contacts 27 and 28 embrace the smaller portions of the insulation sleeve 39, tending to hold the circuit open. As the air bleeds slowly back into casing 85, the bearing spring 91 is finally able to overcome the resistance caused by resilient contacts 27 and 28 and snaps the switch shut with a quick snappy action, after a certain time delay.

Fig. 7 diagrammatically illustrates one type of installation which is conveniently completed by merely inserting my safety starter switch directly into the circuit of the electric starter motor M. In the usual automobile self-starter systems, the battery 109 of the automobile supplies the electrical energy to operate an electric motor M which turns the engine over. To simplify connections, it is common to ground one terminal of the battery on the frame, as represented at 111, and one terminal of the motor M is also grounded, as represented at 113. Such a starter control system, in its simplest form, commonly consists of a conductor 115 from the other terminal of the motor M to one terminal of a conventional starter switch 117, which may be either an instrument-board push button, or a foot pedal, normally biased to open position by a spring 118. Or this starter switch 117 may be provided with an electromagnetic actuator comprising a solenoid winding 119 which draws an armature 121 for pressing the switch shut through a connector 123. One terminal of such a winding being grounded at 119G and the other terminal of the winding being connected through conductor 124 to the ignition conductor 125, the starter switch in such a system is automatically closed when the ignition switch 127 is closed. In accordance with my invention, the other side of the starter switch 117 connects through a conductor 129 to one of the spaced contacts 27 of my safety switch. (Normally this conductor would go directly to the battery.) From the other spaced contact 28 of my switch a conductor 131 connects to the ungrounded terminal of the battery. My starter safety switch, as shown, is represented in the position for closing the circuit through its contact 27, and also contact 28 with its joined contact part 40, both of which are engaged.

As may be seen, the starter motor circuit cannot be completed when the regular starter switch 117 closes, if my safety switch is held open, and this will be caused by either the gear shifter being away from neutral position or by the engine running and producing a partial vacuum above the diaphragm.

Fig. 8 is also a diagrammatic view showing a different automatic starter system utilizing my starter safety switch without passing the heavy starter motor current therethrough. This is conveniently accomplished by connecting the ungrounded terminal of the starter winding 119 through the conductor 124 to one contact 27 of my safety switch, and connecting the other contact 28 of my switch through a conductor 131 to the ignition wire 125. When my starter safety switch contacts 27 and 28 are bridged together, as shown, closing the usual ignition switch 127 causes the starter switch 117 to be closed automatically in the same manner as described with reference to the system of Fig. 7. But if the connection on contact 40 of the safety switch is held open by the shifter being in any other position than neutral, or if operation of the engine causing a suction above diaphragm 47, holds contacts 27 and 28 open, it will be apparent that the winding 119 will not be energized and the starter switch 117 will not be closed.

These control conductors are relatively light wires of small cross-section and easily extended up to the safety switch, which also may be smaller because only light control current capacity is required. Otherwise, the operation of the system and the advantages thereof are similar to that previously described.

Figs. 7 and 8 merely illustrate several useful applications of my safety starter switch, by way of example, from which its use in many other types of starter systems will be readily understood.

Fig. 9 shows a bracket 141 of a suitable offset shape projecting over substantially toward the right-hand side and especially adapted for mounting my improved safety switch means upon automobiles which have the gear shifter 17 disposed in parallel spaced relation to the steering column 11 along the right-hand side thereof, rather than at the front of the steering column. The bracket 141 may be cast of aluminum, or other metal, or it may be a sheet metal stamping, having in the off-set portion an arcuate slot 153 providing clearance for the head of actuator pin 80 which projects from the side of the contactor lever 77 and having an aperture 79' in which the pivot pin 79 of the lever may be inserted, either insulated or uninsulated, as in the modifications previously described. A portion of this bracket 141 is conformed to snugly engage the front of the steering column 11 whereupon the bracket is rigidly secured by screws drawing a clamp band around the column. The bracket may be provided with a marginal flange 142 to impart rigidity thereto.

Figs. 10 and 11 show a different embodiment of gear shifter actuated switch comprising an electrical contact 145 of a shape suitable to be moved into contacting engagement with an adjacent circuit making or grounding element. This contact is for this purpose carried by a support 147 of an elongated form having a pair of clamp lugs 149 projecting from the same side but in a spaced relation for engaging one side of a gear shifter lever or bar 151 (shown dotted). A separate clamp lug 153 is secured by a screw 154 at a mid-portion and it projects for engaging upon the opposite side of the gear shifter bar 151 at a point intermediate the other two clamp lugs 149, so that the support may be secured firmly upon the gear shifter bar or lever at any desired axial position therealong. The end of the support 147 toward the end of the shifter 151 is provided with a laterally projecting contact carrying arm 155 which is suitably apertured to receive the reduced stem 156 of the contact 145 passed through an insulation bushing therein, and having insulation washers 159 on opposite sides. A spring washer 160 maintains tension. The end of the reduced portion 156 of the contact 145, which passes through the support arm, is adapted for receiving and snugly securing an electrical cable lug 161. This may be readily accomplished by making the projecting end of the contact stem 156 of a still smaller diameter to snugly enter the cable lug 161 with washers 164 thereon and thereafter peening the projecting end to swage the metal snugly thereon. By this arrangement, the contact 145 has a low resistance connection with the cable 163 extending from the lug 161 for controlling any circuit to be controlled by the gear shifter.

The lateral support arm 155 carries the contact 145 in a position suitable to abut or engage an adjacent element 165 to make a low resistance electrical connection thereon. As represented, this element 165 may be the end of the other gear shifter bar, in a well known make of automobile. In this installation, at the lower end of the steering column gear shifter, the two gear shifter bars or levers 151 and 165 are disposed in the engine compartment in a side-by-side relation and movable angularly as gears are shifted. By mounting my contact support at a suitable selected axial position upon one of these gear shifter rods, movement of the gear shifter into the neutral position carries the contact 145 to engage the end of the other gear shifter lever. The grounded connection thus established may be utilized in various ways to complete the circuit of the electric starter motor M to crank the automobile engine. The suction responsive switch is also still utilized to render the starter system inoperative when, or so long as, the engine is running, as in Figs. 7 and 8, previously described.

Fig. 12 shows how the wiring system of Fig. 7 is readily adapted to utilize my grounding switch by connecting its contact 145 by the cable 163 to the grounded end of the winding 119 of the starter switch, so that this ground connection will be completed only when the gear shifter is in a neutral position. The suction switch still is utilized but its contact 28 is connected directly and permanently to the conductor 131, as shown.

Fig. 13 shows how the wiring system of Fig. 8 is likewise readily adapted to utilize the separately mounted suction switch and the shifter grounded contact 145 therein.

In both of these systems, Figs. 12 and 13, the suction responsive switch is also easily mounted in any concealed position which is preferably on the inside of a front fender or under the hood where the vacuum connection can be readily made.

It is apparent that within the scope of my invention modifications and different arrangements may be made other than herein disclosed, and the present disclosure is illustrative merely, the invention comprehending variations thereof.

What is claimed as the invention is:

1. In an automobile self-starter safety switch arrangement for steering column gear shifters the combination of, a bracket conformed for convenient mounting on the steering column of an automotive vehicle adjacent a movable gear shifter, an electrical contact, means supporting said contact in electrically insulated relation from said bracket, a circuit closer lever, a pivot pin mounting one end of said lever pivotally upon said bracket with the other end of the lever movable to or from said electrical contact to close or open an associated electrical circuit, and actuator means for swinging said circuit closer lever to engage said contact or to be disengaged therefrom in accordance with movements of the gear shifter.

2. An automobile self-starter safety switch arrangement in accordance with claim 1 and further characterized by said circuit closer lever and said actuator means being relatively set or adjusted so that said circuit closer lever is moved to said contact for closing a circuit only at such times as the gear shifter is in its neutral position.

3. In combination in an automobile self-starter safety switch arrangement for steering column gear shifters, a bracket conformed for having one end conveniently mounted on the steering column of an automotive vehicle with the other end of the bracket spaced from a movable steering column gear shifter, an electrical contact, means supporting said contact in electrically insulated relation from said other end of said bracket, a circuit closer lever, a pivot pin mounting one end of said lever pivotally upon said bracket with the other end of the lever movable to or from said electrical contact to close or open an associated electrical circuit, and actuator means mountable in a laterally projecting relation on such a shifter for swinging said circuit closer lever to engage said contact or to be disengaged therefrom in accordance with rotative movements of the gear shifter.

4. An automobile self-starter safety switch arrangement in accordance with claim 3 and further characterized by said actuator means being settable relatively upon the gear shifter so that said circuit closer lever is moved to said contact for closing a circuit only at such times as the gear shifter is in its neutral position.

5. In an automobile self-starter safety switch arrangement the combination of, a bracket mounted at one end upon the steering column of an automotive vehicle with the other end of the bracket spaced from the adjacent steering column mounted gear shifter, an electrical contact, means mounting said contact in electrically insulated relation on said other end of said bracket, a circuit closing lever, a pivot pin mounting one end of said lever pivotally upon said bracket with the other end of the lever movable to or from said electrical contact, a pin projecting from an intermediate portion of said lever, an actuator arm secured to the gear shifter and having one end projecting therefrom for swinging in an arcuate path as the shifter is rotated in either direction from a neutral position, and the projecting end of said actuator arm being slotted to slidably receive the pin therein from the lever so that the lever is moved to or from the contact with amplified movement as the shifter is moved to or from the neutral position.

6. An automobile safety self-starter control switch comprising, a flexible diaphragm, a switch casing enclosing said diaphragm to receive a variable suction pressure on one side, a connection fitting on said casing for receiving a connection to the intake manifold of an automobile, an electrical contact, means mounting said contact in insulated relation on said casing, a first movable contactor connected to said diaphragm for movement to make a conductive connection from said contact when the suction on the diaphragm decreases and moving away from said contact when the suction increases, mounting means for mounting said casing on the steering column of an automotive vehicle adjacent the gear shifter commonly disposed in parallel relation thereto, a second contactor mounted movably, for continuing said conductive connection established by said contact, and actuator means connectible from such a gear shifter to actuate said second contactor to or from circuit closing position as the gear shifter is moved respectively to or from its neutral position so that a circuit is completed through the switch only when both movable contactors make a connection through said electrical contact.

7. An automobile safety self-starter control switch in accordance with claim 6 and further characterized by said second movable contactor being a lever pivotally mounted at one end toward the gear shifter with the free end of the lever swingable to or from said electrical contact, a pin projecting from an intermediate portion of the lever, and said actuator being an arm secured at one end to the gear shifter with the free swinging end of the arm slotted and receiving said pin freely therein.

HENRY W. LINDENMUTH.

REFERENCES CITED

The following references are of record in the file of this patent:

UNITED STATES PATENTS

| Number | Name | Date |
|---|---|---|
| 1,854,478 | Meyers | Apr. 19, 1932 |
| 1,959,410 | Cohen | May 22, 1934 |
| 2,005,483 | Sucky | June 18, 1935 |
| 2,296,755 | Woods | Sept. 22, 1942 |
| 2,324,819 | Butzbach | July 20, 1943 |
| 2,430,428 | Katcher | Nov. 4, 1947 |
| 2,444,352 | Hoffman | June 29, 1948 |